Feb. 28, 1961  C. E. ELLIOTT  2,973,073
ROLLER-BOLSTER CARGO HANDLING SYSTEM
Filed Nov. 29, 1957  2 Sheets-Sheet 1
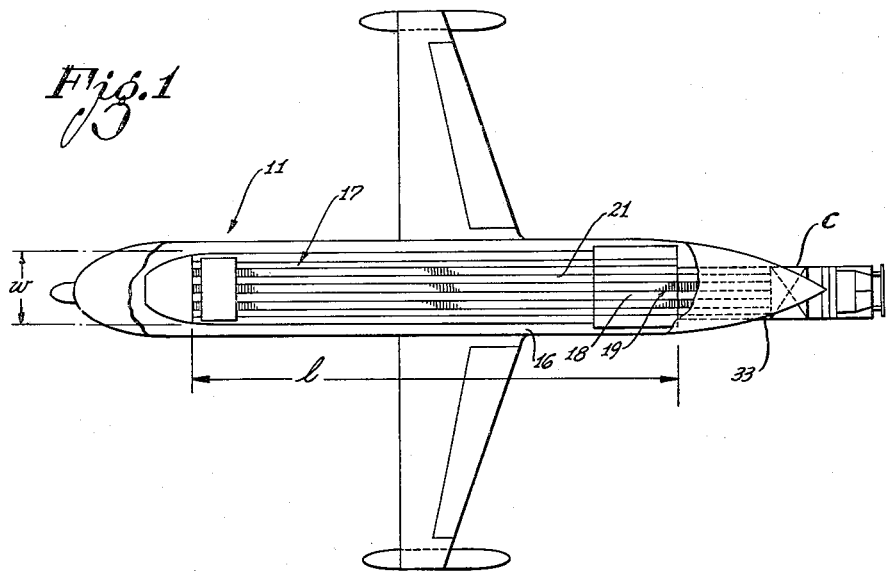
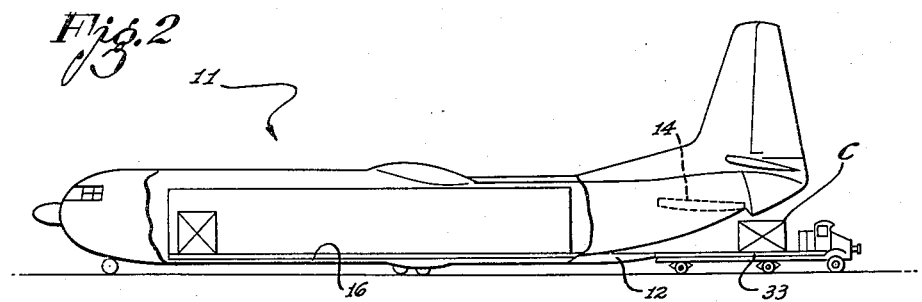
INVENTOR:
Carl E. Elliott
Hubert E. Metcalf
His Patent Attorney

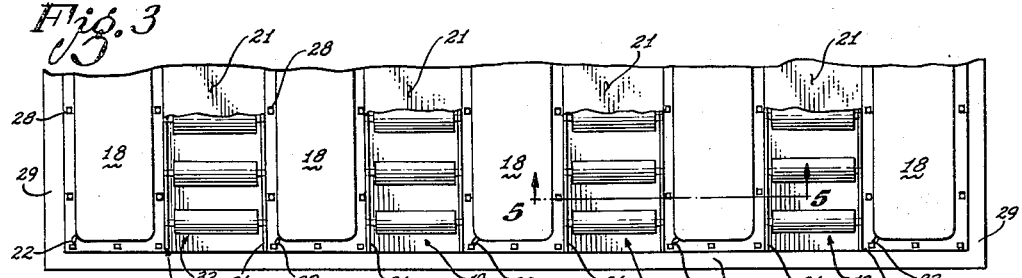
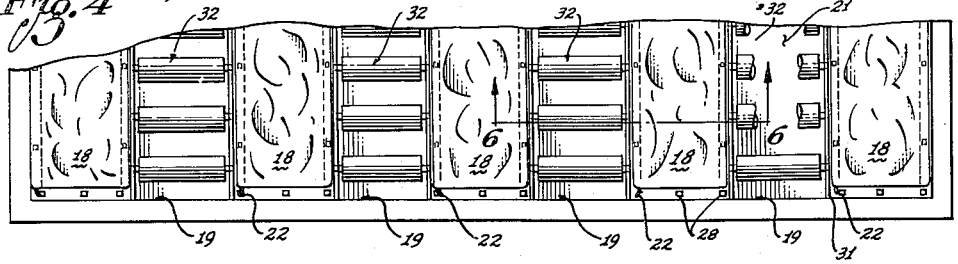
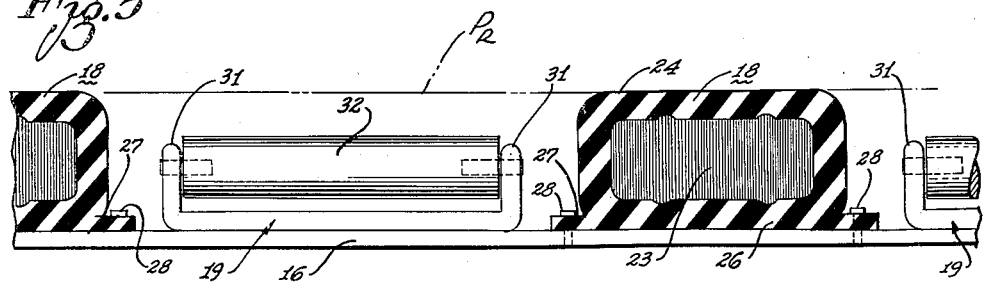
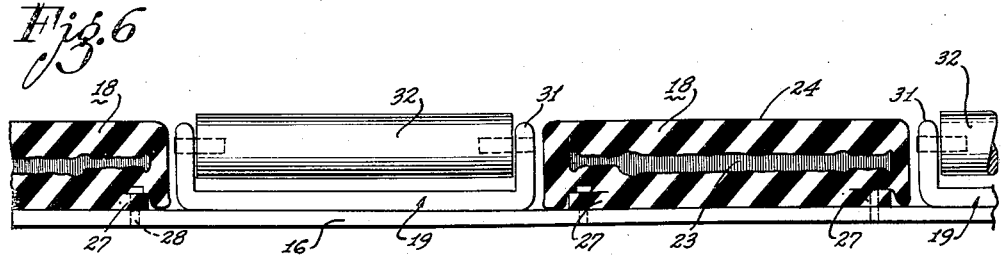

United States Patent Office 2,973,073
Patented Feb. 28, 1961

2,973,073
ROLLER-BOLSTER CARGO HANDLING SYSTEM

Carl E. Elliott, Redondo Beach, Calif., assignor to Northrop Corporation, a corporation of California Filed Nov. 29, 1957, Ser. No. 699,697

2 Claims. (Cl. 193—38)

This invention relates to cargo handling equipment and the method of using the same and more particularly to a cargon conveyance the loading deck of which is equipped with spaced inflatable bolster-like members between which roller assemblies may be selectively positioned or removed and the method of using the same.

Although the cargo handling equipment as disclosed herein is considered primarily for use with aircraft it may also be used to advantage to facilitate the handling of cargo from, to and between trucks, trailers, warehouses, etc. Briefly the cargo handling equipment as disclosed herein consists of a plurality of elongated inflatable bolster-like members which are placed in spaced parallel relation on the floor of a conveyance in or from which cargo is to be loaded or unloaded. The spacing between the individual bolster-like members is such that the roller assemblies may be positioned therebetween with suitable clearance on each side of the roller assemblies. The cargo is loaded directly on the bolster-like members, these members when inflated provide sufficient space for the roller assemblies to be positioned therebetween even though cargo is loaded thereon.

An object of the present invention is to provide a cargo carrying conveyance including cargo handling equipment and in which the latter may be installed in the conveyance with minimum or no modification thereof.

Another object is to provide a cargo carrying conveyance including cargo handling equipment, the latter being constructed, arranged and operated in a manner allowing the tare weight of the handling equipment to be reduced to a minimum at such time as the cargo is intransit.

Another object is to provide a cargo carrying conveyance including cargo handling equipment employing roller assemblies which may be installed in the conveyance prior to cargo loading and/or unloading operations and removed from the conveyance at such time as the cargo is intransit.

Another object is to provide a cargo carrying conveyance including cargo handling equipment constructed, arranged, and operating in a manner which renders cargo loaded on the deck of the conveyance extremely stable, with respect to the deck, during such times as the cargo is intransit.

Another object is to provide a cargo carrying conveyance including cargo handling equipment and in which the latter is extremely light in weight, is simple in design yet rugged in construction, is economical to manufacture and install, and which may be easily installed in most conveyances with minor or no alterations to either the equipment or the conveyance.

Although the characteristic features of the present invention are particularly pointed out in the appended claims, the invention itself, also the manner in which it may be carried out, will be better understood by referring to the following description taken in connection with the accompanying drawings forming a part of this application and in which:

Figures 1 and 2 constitute plan and side elevational views, respectively, of a cargo plane having cargo handling equipment of the type disclosed herein installed on the plane's cargo deck. In each figure portions of the plane have been broken away to better illustrate the position of the cargo handling equipment in the plane.

Figures 3 and 4 are detail fragmentary plan views of the cargo deck of the plane shown in Figures 1 and 2 and in which the bolster portions of the cargo handling equipment are inflated and deflated, respectively.

Figures 5 and 6 are sectional views taken on lines 5—5 and 6—6 of Figures 3 and 4, respectively.

Referring now to the drawings, Figures 1 and 2 show a cargo plane 11 having rearwardly opening doors 12 and 14. The plane is provided with a cargo loading deck 16 defining a generally rectangular area as indicated by the letters *l* and *w*. The upper surface of the deck 16 defines a plane surface which is horizontal at such times as the plane 11 is grounded. Mounted on the deck 16 is the cargo handling facility 17 as disclosed herein.

The cargo handling facility 17 includes a plurality of elongated bolster-like members 18 and a plurality of roller assemblies 19. The members 18 are rectangular in plan, they extend throughout the length of the deck 16 and are spaced to provide a plurality of elongated passageways 21 adapted to receive respective roller assemblies 19 therebetween.

The bolster-like members 18 are of identical construction and constitute inflatable cells which are fabricated of a material such as rubber, fabric, plastic, etc. or combinations of these materials. Valve stem means 22 are provided in each of the individual bolster-like members 18 by means of which they may be inflated or deflated as desired. In this respect it will be apparent that all of the valve stem means 22 may be connected to and supplied with pressurized air from a common supply line (not shown), thus all of the members 18 may be simultaneously inflated and deflated. Also each of the individual members 18 may be of unitary construction, extending the full length of the deck 16, or they may constitute a plurality of individual cells arranged in end to end abutting relation.

Specifically the members 18 may conform to a construction commonly referred to as "Air Mat" construction. In this type of construction the walls of each of the members 18 are constructed of a rubber-coated nylon fabric having thousands of rugged nylon hairs 23 attached to and extending between the upper and lower surfaces thereof substantially as shown in Figures 5 and 6. The hairs 23 function in a well known manner to maintain the upper and lower surfaces 24 and 26, respectively, of the members 18 in parallel relation at such time as the members are fully inflated. At such time as the members 18 are fully inflated, as shown in Figures 3 and 5, they are substantially rectangular in cross-section. The walls of the members being constructed of rubber-coated nylon fabric are inherently impervious to air at high pressure and are extremely tough and rugged. At such times as the members 18 are completely deflated they assume a position as shown in Figures 4 and 6, this latter position is subsequently referred to as the collapsed position of the members 18.

Although the members 18, as shown in Figures 5 and 6, are substantially rectangular in cross-section it will be understood that they may be of various configurations. For example, the sides of the members 18, defined in part by the side walls and the upper surface 24 of the members 18, may be rounded to a greater extent than shown or their side edges may be beveled or tapered as desired. The rounding, tapering or beveling of the side edges of the members 18 in the above manner permits a jeep, fork truck or the like to move over the members 18 without encountering an abrupt or pronounced edge over which the jeep or truck must climb.

In the embodiment shown each of the members 18 is provided with an integrally formed apertured flange 27 which extends completely around the respective members 18 in a plane substantially in the plane of the lower surface 26 as best seen in Figures 5 and 6. The flanges provide means whereby the members 18 may be secured in fixed relation on the deck 16 by bolts 28, screws or the like. Other types of fastening means such as suction cups, quick disconnect fasteners and the like may also be used to secure the members 18 to the deck 16. In this respect all fastening means may be dispensed with, in this case the weight of the members themselves will serve to retain them in position under normal conditions. The two outermost members 18 are positioned fairly close and extend parallel to the respective side walls 29 of the fuselage of the plane 11. Other members 18 are spaced laterally on the deck 16 to provide the aforementioned longitudinally extending passageways 21 of equal width as best seen in Figures 3 and 4.

The aforementioned roller assemblies 19 are of conventional design and construction consisting of an elongated frame 31 which is rectangular in plan and which carries a plurality of spaced rollers 32. By referring to Figures 5 and 6 it will be seen that the members 18 are spaced so that a respective roller assembly 19 may be freely positioned in a passageway 21 defined by two adjacent members 18. In this respect it will be seen that the side rails of the assemblies 19 clear the sides of adjacent members at such times as the latter members are in their collapsed postiions.

The members 18 may be inflated by attaching the individual valve means 22 to the aforementioned common supply line (not shown). Thus the bolster-like members are inflated and caused to assume their fully inflated positions as shown in Figure 5. In their fully inflated positions it will be seen that the upper surfaces 24 define planes, due to the restraining action of the hairs 23, which lie in a common reference plane $P_R$ which is parallel to the upper surface of the deck 16. It will also be seen by referring to Figure 5 that the uppermost peripheral portions of the rollers 32 are located below the upper surfaces 24 of the members 18 at such time as the latter members are in their fully inflated positions. Accordingly it will be apparent that the assemblies 19 may be slid in the passageways 21 in a longitudinal direction when the members 18 are fully inflated even though cargo is in position on the upper surfaces of the members 18. In this respect winch means (not shown) may be provided at the forward end of the plane 11 to facilitate this operation. It will also be obvious that a single assembly 19 need not extend the full length of the deck 16, rather it is preferable that a plurality of assemblies are releasably secured together.

The various components of the cargo handling facility, the relation of the various components thereof, and their relation to the deck 16 having been described, a better understanding of the cargo handling facility will be forthcoming from the following description of the method of using the facility to execute a cargo handling operation.

Referring to Figure 1 the loading phase of a cargo handling operation will first be described. It is assumed that the members 18 have previously been secured to the deck 16 and the assemblies 19 positioned therebetween in the manner previously described. The bolster-like members are completely deflated. A trailer 33, carrying a portion of the cargo C to be loaded on the plane 11, is aligned with the deck 16 in abutting relation. The bed of the trailer 33 may be equipped with cargo handling equipment substantially as shown and disclosed herein or it may be equipped with conventional roller assemblies to facilitate the handling of cargo C loaded thereon.

It will now be apparent that the cargo may be transferred from the trailer 33 to the plane 11 in a conventional manner utilizing the assemblies 18 and the roller assemblies (not shown) positioned on the trailer for this purpose. In this respect the aforementioned winch means (not shown) may be utilized in effecting this transfer. After the loading operation is effected all of the bolster-like members 18 are completely and simultaneously inflated. This elevates the cargo to the position of the reference plane $P_R$ which is located a predetermined distance above the assemblies 19, substantially as shown in Figure 5, and frees the latter assemblies. The assemblies 19 may now be slid rearwardly from under the cargo, the bolster-like members 18 are then completely deflated, and finally the cargo is secured to the deck 16 by hold-down means (not shown). Thus it will be seen that weightwise a major portion of the cargo handling facility has been removed from the plane 11 prior to the flight or in transit phase thereof.

In unloading the cargo from the plane 11 the reverse procedure of that described above is followed. The hold-down means (not shown) are first released, the members 18 are then fully inflated, roller assemblies 19 are then slid into position under the cargo substantially as shown in Figure 5, the members 18 are then collapsed, after which the cargo is unloaded in a conventional manner.

In the handling of cargo as described herein roller assemblies must be available at the loading and unloading airports of the plane 11. Since an aircraft utilizing this type of cargo handling equipment would serve only major airports this requirement would not create a problem of any magnitude. Cargo handling equipment of the present type will also be limited to large containers or palletized cargo, the latter being extensively used at present in the handling and storage of cargo. Although compressed air appears to be the most suitable medium for inflating the members 18 pressurized liquid may also be used for this purpose if desired.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed:
1. The combination with a conveyance having a cargo deck defining an upper plane surface of cargo handling equipment, said cargo handling equipment comprising a plurality of elongated unhoused inflatable bag-like members constructed of a flexible material which is non-pervious to compressed air and having upper, lower and side walls, said bag-like members being fixedly mounted on said plane surface in spaced parallel relation with their lower walls contacting said plane surface and defining a plurality of spaced passageways, valve stem means in each of said bag-like members enabling said bag-like members to be inflated and deflated, said bag-like members including thread-like means secured to and extending between said upper and lower walls limiting the expansion thereof whereby the upper walls of all of the said bag-like members are located in a common plane at such times as said members are fully inflated, and a plurality of mobile roller assemblies which may be selectively positioned in or removed from said passageways at such times as said members are fully inflated and cargo is supported on their upper walls.

2. The combination with a conveyance having a cargo deck defining an upper plane surface of cargo handling equipment as set forth in claim 1: further characterized in that said thread-like means constitutes a plurality of nylon filament-like elements.

References Cited in the file of this patent

UNITED STATES PATENTS

| | | |
|---|---|---|
| 1,809,540 | Young | June 9, 1931 |
| 2,117,067 | Ludington | May 10, 1938 |
| 2,117,068 | Ludington | May 10, 1938 |
| 2,828,027 | Stevenson et al. | Mar. 25, 1958 |